United States Patent Office 2,993,881
Patented July 25, 1961

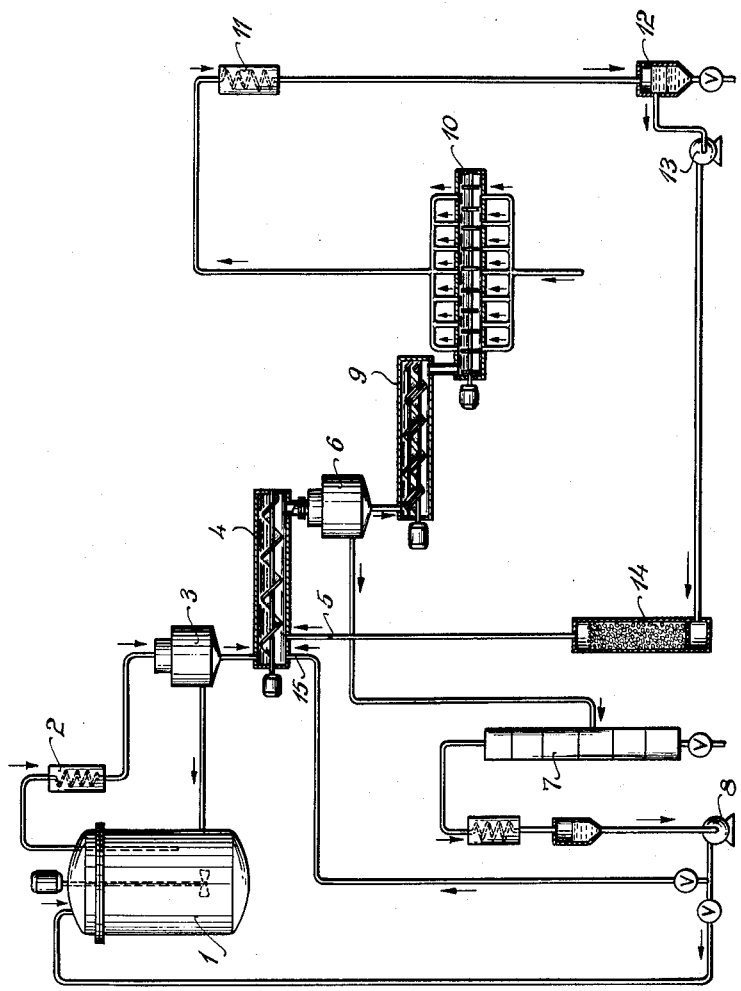

2,993,881
PROCESS FOR THE CONTINUOUS POLYMERIZA-TION OF ETHYLENE
Nikolaus Geiser, Oberhausen-Holten, and Helmut Kolling, Duisburg-Hamborn, Germany, assignors to Ruhrchemie Aktiengesellschaft, Oberhausen-Holten, Germany
Filed Feb. 27, 1957, Ser. No. 642,842
Claims priority, application Germany Mar. 5, 1956
3 Claims. (Cl. 260—94.9)

The polymerization of ethylene at pressures below about 100 kg./sq. cm. and at temperatures up to about 100° C. is known. In this process, use is made of catalysts which consist of mixtures of organo-metallic compounds, especially aluminum alkyl compounds, and compounds of metals of the 4th to 6th subgroups of the periodic system (see Belgian Patents Nos. 533,362 and 534,792 and "Angewandte Chemie," vol. 67, 541–547 (1955)). In this synthesis, use is generally made of an auxiliary liquid in which the polyethylene formed is suspended. Hydrocarbon fractions of the gasoline or diesel oil boiling range are generally used as auxiliary liquid. It is necessary that the hydrocarbon fractions used as auxiliary liquid be very carefully freed from moisture and other oxygen-containing compounds since otherwise the course of polymerization is disturbed.

The reaction product withdrawn from the reaction vessel in this polymerization of ethylene comprises polyethylene, auxiliary liquid and residues of catalyst. To separate the polyethylene, the same is first filtered off from the bulk of the auxiliary liquid. A mass is thereby obtained which still contains residues of auxiliary liquid, residues of catalyst, and the polyethylene.

It has already been suggested to remove the hydrocarbons, remaining in the reaction mass after mechanical separation of the bulk of the auxiliary liquid, as well as the residues of catalyst by a treatment with steam effected, if necessary or desired, in the presence of dilute mineral acids or dilute alkali solutions. In this treatment, the hydrocarbons are driven off by the steam and may be separated from the same by condensation. However, the hydrocarbon auxiliary liquid recovered in this manner cannot be directly returned into the polymerization vessel, since it contains water and sometimes also small amounts of other oxygen-containing compounds. Also, the usual drying, e.g. with granular calcined calcium chloride, will not solve the problem since sufficient water and oxygen-containing compounds are retained as to cause serious interferences with the course of the polymerization when returning the auxiliary liquid treated in this manner.

It has been found that these difficulties can be avoided if the process for the continuous polymerization of ethylene at pressures below about 100 kg./sq. cm. and temperatures up to about 100° C. with the use of catalysts consisting of mixtures of organometallic compounds, especially aluminum alkyl compounds, with compounds of metals of the 4th and 6th subgroups of the periodic system, especially titanium compounds, e.g. titanium tetrachloride, and in the presence of an auxiliary liquid consisting of hydrocarbon fractions of the gasoline or diesel oil boiling range, is carried out according to the method of the present invention. In this mode of operation, the reaction mixture is withdrawn from the polymerization vessel and the bulk of auxiliary liquid is separated; a certain amount of auxiliary liquid is then still contained in the reaction mixture and is removed by treatment with steam, the loss of auxiliary liquid incurred during the steam treatment being made up by addition of the equivalent amount of fresh auxiliary liquid. Before being returned into the polymerization vessel, the auxiliary liquid is, preferably after predrying with one of the conventional drying agents e.g. calcium chloride, intimately contacted with the reaction mixture withdrawn from the vessel and still containing residues of catalyst and then is mechanically separated from this mixture.

According to a specific embodiment, the auxiliary liquid to be treated is not contacted with the reaction mixture leaving the polymerization vessel until the bulk of auxiliary liquid contained in the mixture has been removed therefrom.

It is preferable to subject the auxiliary liquid, after the treatment, to a distillation and to return only the distillate thereby obtained into the polymerization vessel.

By the intimate contact, involved in the process of the invention, of the auxiliary liquid to be returned into the polymerization vessel with the reaction mixture withdrawn from this vessel and still containing residues of catalyst, any oxygen-containing compounds contained in the residual auxiliary liquid are reacted with the residues of catalyst contained in the reaction mixture. In addition to other compounds, titanium hydroxides and aluminum hydroxides are formed thereby. These slimy compounds which are difficult to filter are retained by the pulverulent polyethylene mass so that any difficulties in the subsequent filtration are avoided, which difficulties may occur, for example, if, according to another proposal, the auxiliary liquid is pretreated with the polymerization catalyst or its components, e.g., with titanium tetrachloride. In contrast to this working method which has been suggested for the same purpose, no additional catalyst is required for the purification of auxiliary liquid in the process of the invention.

The removal of the last portions of all oxygen-containing compounds, especially of the last portions of water, has the great advantage that any interferences with the course of the polymerization are no longer encountered when returning the thus pretreated auxiliary liquid into the reactor. Otherwise, the reactions which, in the process of the invention, occur during the pretreatment, would take place in the polymerization vessel proper and the primarily forming oxygen-containing decomposition products of the catalyst would be harmful to additional catalyst portions causing a substantial increase in the consumption of the catalytic substance. An increased quantity of catalyst, apart from raising the cost of the process, will result in a large increase of the ash content in the reaction mass discharged. The removal of this ash content requires cumbersome operational steps which add to the cost of the process.

Moreover, the process of the invention involves additional advantages. In addition to the hydrocarbon auxiliary liquid, residues of catalyst, and polyethylene, the mixture discharged from the reaction vessel contains small portions of waxy products formed as by-products in the polymerization of ethylene. It may be of great advantage for the processing of the polyethylene if these waxy products are removed. This is partially achieved by the working method described above, in which the waxy by-products dissolve in the auxiliary liquid and, when distilling the same, remain in the bottoms of the distillation column. The quantity of wax extracted from the reaction mixture can be substantially increased when only part of the distillate is returned into the polymerization vessel and the larger portion is returned into the treating apparatus. In this embodiment of the process of the invention, sufficient distillate is returned into the apparatus used for intermixing, e.g. into a mixing screw, that the ratio by weight of auxiliary liquid to polyethylene in the screw is higher than 2:1, e.g. 5:1 to 15:1. An increase in the amount of wax extracted is also possible by increasing the treating temperature from about 20° C. to about 90° C. Thus, the intermixing of the residual auxiliary liquid with the reaction mixture mechanically freed from the bulk of auxiliary liquid is effected at temperatures as high as about 90° C. Recycling of the auxiliary liquid not only results in a removal of the wax portions from the reaction mixture, but also in an additional reduction in ash content. This improvement is due to the fact that an increased yield of polyethylene and a reduced amount of catalyst will decrease the ash content in the reaction mass discharged from the polymerization vessel. To this reduction in ash content, there is now added an additional removal of catalyst portions by the treatment of the discharged reaction mass with the auxiliary liquid, which catalyst portions may be withdrawn in the bottoms of the subsequent distillation. In particular, the treatment of the reaction mass with larger amounts of auxiliary liquid has the effect of very definitely reducing the chlorine content as may be seen in detail from the following examples. A reduced chlorine content may play a decisive part in the processing of polyethylene.

The advantages of the process of the invention may be summarized as follows:

(1) Purification of the auxiliary liquid returned into the polymerization vessel thereby increasing the yield of polyethylene and consequently substantially reducing the ash content in the polyethylene.

(2) Extensive purification of the auxiliary liquid without additional consumption of catalyst mass or other chemicals.

(3) Extraction of wax portions from the polyethylene.

(4) Additional reduction in the ash and chlorine contents of the polyethylene.

The technical performance of the process of the invention may be illustrated with reference to the appended flow sheet which illustrates only one specific embodiment.

Reaction products are withdrawn from a polymerization reactor 1 via a cooler 2. In a filter device 3, e.g. a continuously operating centrifuge, they are separated into a filtrate which is returned into the polymerization reactor, and a residue. The residue which comprises polyethylene, auxiliary liquid, and residues of catalyst, is passed into a mixing screw 4 where it is intimately mixed with auxiliary liquid admitted through line 5 and the mixture, in a subsequent filter device 6, is separated into a filtrate and a residue. In a distilling column 7, the filtrate is separated into a residue and a distillate; the latter is returned into the polymerization reactor 1 by means of a pump 8. The residue obtained in the filter device 6 is moved on into a steaming screw 10 by means of a twin screw 9 which simultaneously acts as a conveying means and a gastight seal. In this screw 10, the mass is freed from auxiliary liquid still adhering to it, by driving off the liquid with steam. The steam to which small amounts of mineral acids or alkali solutions may be added to remove any remaining residual catalyst, is injected in a direction at right angles to that of the reaction mass being moved, i.e. in a cross current. It escapes, together with any remaining residues of auxiliary liquid, through outlets provided on the cover of the screw trough and is condensed in a condenser 11. The water is separated in a tank 12. The hydrocarbon auxiliary liquid is forced, by means of a pump 13, through a drying tower 14 which is filled with granular calcium chloride, and is then passed through line 5 and into the mixing screw 4 as explained above.

The ratio of auxiliary liquid, introduced through line 5 into the mixing screw, to the polyethylene contained in the reaction mixture introduced from the filter device 3 may be increased as desired by returning a more or less large portion of distillate from the distilling column and through line 15 into the mixing screw 4 by means of the pump 8. Thereby, a cycle of auxiliary liquid is obtained between the mixing screw 4, the filter device 6 and the distilling column 7. The wax portions extracted from the reaction mixture are retained in the bottoms of the distilling column.

To increase the amount of wax extracted, it may be advantageous to operate the mixing screw 4 at temperatures as high as about 90° C., which may be attained by heating the screw by means of a jacket or by appropriately preheating the auxiliary liquid.

It may also be of advantage to connect in series several units each comprising a mixing screw 4 and a filter device 6. In this case, the auxiliary liquid withdrawn from the distilling column 7 is distributed over the screws or is conducted in countercurrent to the reaction mixture travelling through, with the freshly distilled auxiliary liquid being first introduced into the last screw and thence successively into the preceding screws.

Finally, a very simplified mode of operation consists in introducing the predried auxiliary liquid withdrawn from the drying tower 14 into the reaction mixture upstream of the filter device 3. The purification of the auxiliary liquid is then effected in the filter device 3. The purified auxiliary liquid is directly passed into the reactor 1, while the resulting decomposition products of the catalyst, together with the residue, are discharged from the filter device and are passed through the twin screw 9 and into the steaming screw 10.

In the following, the invention will be more fully described in a number of examples, but it should be understood that these are given by way of illustration and not of limitation and that many changes in the details can be made without departing from the spirit of the invention.

*Example 1*

The continuous polymerization of ethylene on a laboratory scale was effected with a reaction vessel of glass having a capacity of about 5 liters and provided with a stirrer, a gas inlet tube, a thermometer holder and a gas outlet line with cooler.

Moreover, the reaction vessel was provided with an immersion tube through which part of the reaction mixture was led off into a heatable filtration vessel which was carefully protected from air and moisture, had a glass frit at the bottom, and was provided with a stirrer. Before starting the experiment, the reaction vessel had been filled with about 2 liters of an aliphatic $C_8$ to $C_{10}$ fraction which had been dried over calcium chloride and subsequently mixed with 0.1 gm./liter of $TiCl_4$ and separated from the precipitate formed.

During the continuously operated experiment, ethylene gas having a total content of $H_2O$, $O_2$, $CO_2$, CO and $C_2H_2$ of not more than about 15 p.p.m. was introduced into the reaction vessel in such an amount that a small amount of excess ethylene could escape. Moreover, a batch of 3 cc. of carefully dried air was introduced within about 2 minutes into the reaction vessel every hour. This addition of air was only omitted during the hour following each addition of catalyst. An amount of 0.2 gm. of catalyst was filled into the reaction vessel after the slowing down of the ethylene conversion which occurred at intervals of about 3–5 hours. The catalyst had been prepared by mixing together 0.086 gm. of diethyl aluminum monochloride dissolved in about 10 cc. of the purified $C_8$–$C_{10}$ fraction and 0.114 gram of titanium tetrachloride likewise dissolved in about 10 cc. of the gasoline fraction, and stirring the mixture for about 30 minutes in a vessel with stirrer. Before each addition of fresh catalyst, sufficient reaction mixture was withdrawn into the filter vessel as to maintain the solids content in the reaction vessel at a constant level of about 15%.

In the filter vessel, the reaction mixture was filtered off through the glass frit and the filtrate was returned into the reaction vessel. Then that quantity of $C_8$ to $C_{10}$ fraction dried over calcium chloride was filled into the filter vessel, which was subsequently obtained from the filter residue by steam distillation. The filter residue was stirred with this quantity of gasoline for about 15 minutes at about 50° C., filtered again and the filtrate was returned into the reaction vessel. The filter residue was removed from the filter vessel and treated with 0.5% sodium hydroxide solution at 100° C. until the adhering gasoline was driven off. Finally, the polymer was freed from the caustic solution by washing and dried.

In following this mode of operation, a yield of 1230 grams of polyethylene could be obtained per gram of catalyst. The dried polyethylene obtained had an ash content of 0.02% by weight and a chlorine content of 0.004% by weight.

If, deviating from the working method according to the invention, the $C_8$ to $C_{10}$ fraction obtained by the treatment with 0.5% sodium hydroxide solution was only dried with calcium chloride and then returned into the reaction vessel without having previously been treated with the discharged reaction mass in the filter vessel, with the other operational steps being as described above, a yield of only 780 grams of polyethylene per gram of catalyst could be obtained. The polyethylene obtained in this case had an ash content of 0.04% by weight and a chlorine content of 0.007% by weight. If the quantity of catalyst of 0.2 gm. added in intervals of about 4 to 5 hours was added in two portions of 0.1 gram each, it could be observed, moreover, that practically no increase in ethylene conversion occurred upon addition of the first 0.1 gm. This proved the fact that about half of the catalyst added has been consumed for the purification of the ethylene.

*Example 2*

Another continuous laboratory experiment was carried out under the same conditions as those of Example 1. Deviating from the working method of Example 1, the gasoline resulting in the treatment with 0.5% sodium hydroxide solution and predried with calcium chloride, after treatment with the reaction mixture separated from the bulk of the gasoline fraction in the filter vessel and after filtration, was distilled up to a temperature of 180° C. in a distilling column. A sufficient portion of the distillate was returned into the filter vessel to arrive in the treatment of the reaction mixture with this gasoline, at a ratio of about 1:10 by weight of polyethylene to the gasoline fraction in the filter vessel. The temperature in this treatment was maintained at 80° C. The same quantity of gasoline as obtained in the treatment with sodium hydroxide solution was returned into the polymerization reactor.

By working in this manner, a yield of 1310 grams of polyethylene was obtained per gram of catalyst. The dried polyethylene obtained had an ash content of 0.02% by weight and a chlorine content of 0.002% by weight. Moreover, it contained only 0.4% by weight of waxy constituents while the polyethylene not subjected to the treatment according to the invention had a wax content of 0.9% by weight.

What we claim is:

1. A continuous process for the polymerization of ethylene at pressures below about 100 kg./cm.$^2$ and at temperatures up to about 100° C. using catalysts consisting of mixtures of aluminum alkyl compounds with compounds of metals of the 4th to 6th subgroup of the periodic table and in the presence of an auxiliary liquid consisting of hydrocarbons of the gasoline and diesel oil boiling range, which comprises the steps of separating the bulk of said auxiliary liquid from the reaction mixture withdrawn from the polymerization vessel and reusing said bulk; removing the residual auxiliary liquid, remaining in the reaction mixture, therefrom by a treament with steam, recovering said steam-treated residual auxiliary liquid and drying same; making up the loss in auxiliary liquid incurred by said steam treatment with the equivalent amount of fresh auxiliary liquid; bring steam-treated plus make-up auxiliary liquid, still containing traces of moisture, in intimate contact with the reaction mixture from which the bulk of auxiliary liquid had been removed and which still contains catalyst residues; mechanically separating the steam-treated plus make-up auxiliary liquid from said reaction mixture and distilling same to remove dissolved waxes; and returning the steam-treated plus make-up auxiliary liquid into the polymerization vessel.

2. The process according to claim 1, wherein a sufficient quantity of distillate is returned into the apparatus used for mixing, to bring the proportion by weight of auxiliary liquid to polyethylene therein to more than about 2:1 and up to 15:1.

3. The process according to claim 2, wherein the mixing of the residue of auxiliary liquid with the reaction mixture separated from the bulk of auxiliary liquid is effected at temperatures of about 90° C.

References Cited in the file of this patent

UNITED STATES PATENTS

| | | |
|---|---|---|
| 2,502,444 | Faragher | Apr. 4, 1950 |
| 2,824,089 | Peters et al. | Feb. 18, 1958 |
| 2,827,447 | Nowlin et al. | Mar. 18, 1958 |
| 2,832,759 | Nowlin et al. | Apr. 29, 1958 |
| 2,838,477 | Roelen et al. | June 10, 1958 |
| 2,889,314 | Fritz | June 2, 1959 |

FOREIGN PATENTS

| | | |
|---|---|---|
| 533,362 | Belgium | May 16, 1955 |

OTHER REFERENCES

Perry: Chemical Engineers Handbook, published by McGraw-Hill, 1941 (pp. 1216–1220).